Dec. 1, 1964  C. E. BRANICK  3,159,085
QUICK RELEASE BUMPER JACK
Original Filed Oct. 30, 1961  2 Sheets-Sheet 1
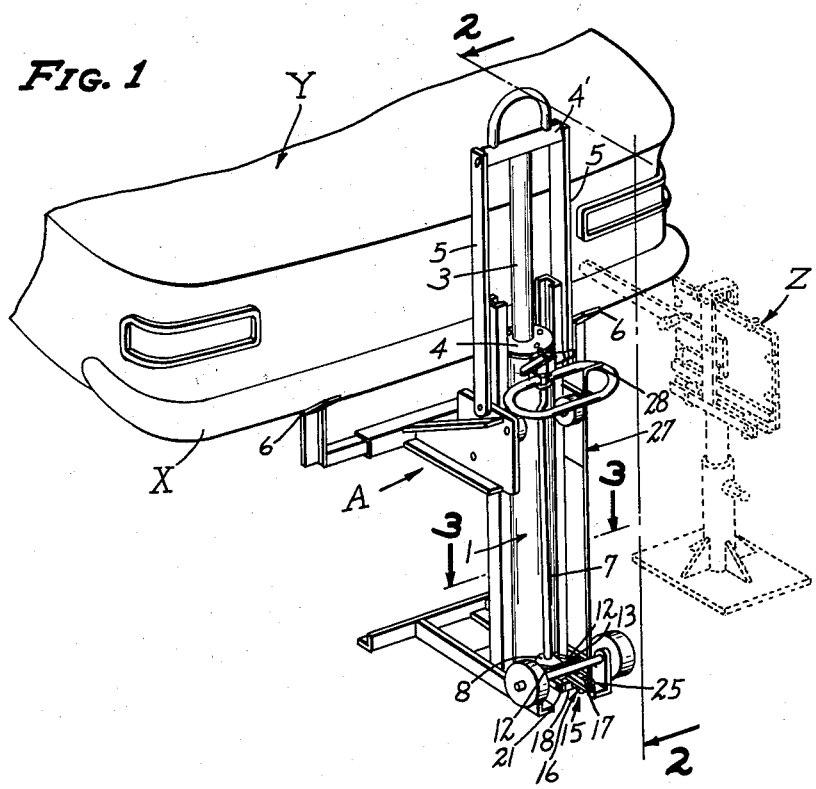
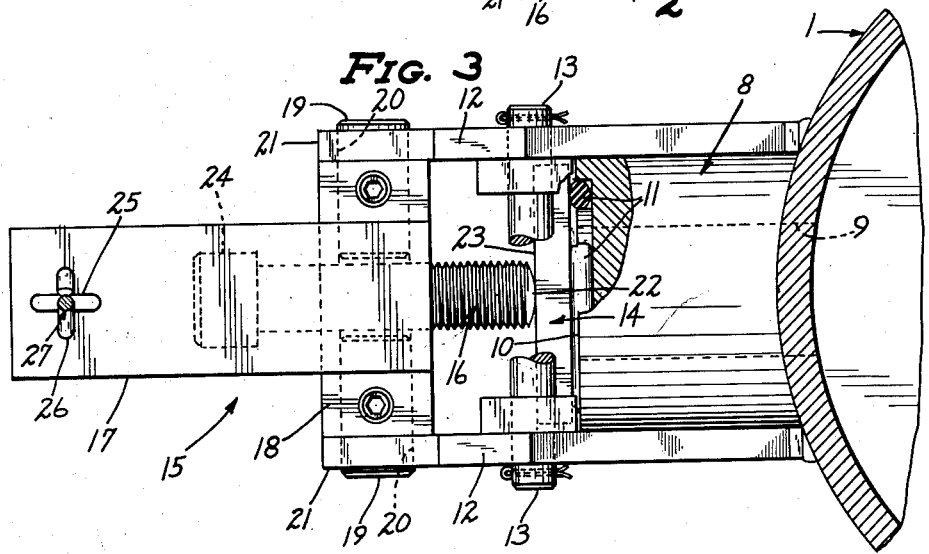
INVENTOR.
CHARLES E. BRANICK
BY
Merchant, Merchant & Gould
ATTORNEYS Dec. 1, 1964 C. E. BRANICK 3,159,085
QUICK RELEASE BUMPER JACK
Original Filed Oct. 30, 1961 2 Sheets-Sheet 2

INVENTOR.
CHARLES E. BRANICK
BY
Merchant, Merchant & Gould
ATTORNEYS

United States Patent Office 3,159,085
Patented Dec. 1, 1964

3,159,085
QUICK RELEASE BUMPER JACK
Charles E. Branick, P.O. Box 1937, Fargo, N. Dak.
Continuation of application Ser. No. 148,434, Oct. 30, 1961. This application Apr. 17, 1963, Ser. No. 274,385
3 Claims. (Cl. 91—451)

This application is a continuation of my pending application entitled "Quick Release Bumper Jack," filed October 30, 1961, under Serial No. 148,434, and formally allowed on December 3, 1962 now abandoned.

My invention relates to bumper jacks and has for its primary object the provision of novel means whereby the utility of a conventional bumper jack may be greatly enhanced.

More specifically, the object of my invention is the provision of a bumper jack which may be used in conjunction with the testing of shock absorbers of automotive vehicles.

Still more specifically, the object of my invention is the provision of a relatively heavy duty cylinder-piston-equipped fluid pressure operated bumper jack which not only may be used to raise and gradually lower vehicles in a conventional manner, but which also may be used to raise and thereafter quickly release the piston and load carried thereby so as to permit same to drop freely for the purpose of checking the operational efficiency of the shock absorbers associated with said vehicle.

A further object of my invention is the provision of a device of the class described which is inexpensive to construct and which incorporates a minimum of working parts.

A still further object of my invention is the provision of a device of the class described which is extremely easy to operate, is rugged and durable in construction, and foolproof.

The above and still further objects of my invention will become apparent from the following detailed specification, appended claims and attached drawings.

Referring to the drawings wherein like characters indicate like parts throughout the several views.

FIG. 1 is a view in perspective of my novel device illustrating its use on an automotive vehicle, some parts being broken away;

FIG. 3 is a view in fragmentary section as seen substantially from the line 3—3 of FIG. 1.

Figure 2:
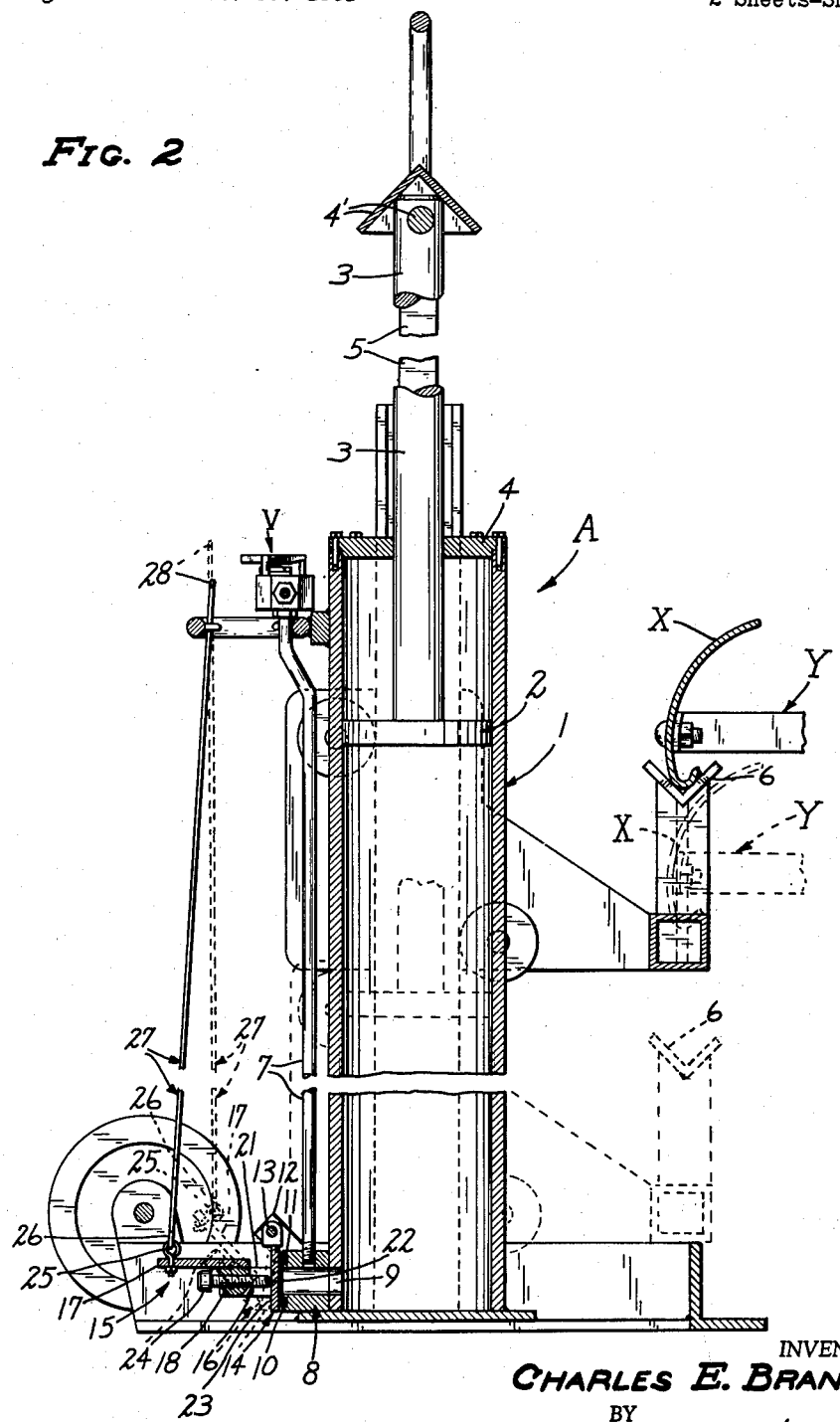
FIG. 2 is an enlarged fragmentary view in vertical section as seen from the line 2—2 of FIG. 1.

Referring with greater particularity to the drawings, the bumper jack, identified in its entirety by the letter A, is of generally conventional design and includes a vertically disposed cylinder 1 having a cooperating fluid pressure operated piston 2 therein. Associated with the cylinder 1 is a lifting plunger 3 which projects through and has slidable engagement with the cylinder head 4.

Secured to the upper end of the plunger 3 is a cross head 4′, the opposite ends of which support depending legs 5. The legs 5 are suitably guided for raising and lowering movements in any suitable manner, such as shown in my Patent 2,740,607, and have operatively secured to their lower ends laterally spaced yoke-like heads 6 (identified by the numeral 25 in my said patent). Heads 6 are adapted to engage the bumper X of a conventional automotive vehicle Y.

Fluid under pressure is introduced into the cylinder 1 through an air hose 7 and gradually released therefrom by means of any suitable valve mechanism such as shown in my Patent 2,310,892, and indicated by reference character V in FIG. 2. However, when it is desired to use my jack in connection with the testing of the efficiency of the shock absorbers of an automotive vehicle, it is necessary that the plunger 3 and load carried thereby be permitted to drop freely; and for this purpose I provide the following quick acting release valve: the numeral 8 identifies a tubular discharge neck rigidly secured to the lower end portion of the cylinder 1 and having communication with the interior of the cylinder through a relatively large port 9. The laterally projected outer end of the neck 8 defines an annular laterally opening mouth 10 in which is partially recessed a sealing grommet or O-ring 11.

Rigidly secured to opposite sides of the neck 8 and projecting laterally outwardly and upwardly therefrom are a pair of anchoring ears 12. Pivotally secured on a pintle 13 extending between the free outer ends of the anchoring ears 12, for swinging movements toward and away from the mouth 10, is a closure plate 14. As shown, and by virtue of the location of the pintle 13 with respect to the mouth 10, the closure plate 14 is under gravity bias to move toward sealing engagement with said mouth 10.

In order to impart positive sealing movements to the closure plate 14, I provide lever means, identified in its entirety by the numeral 15. The lever means 15 comprises an inner tip portion 16, and an outer actuating portion 17. Preferably, and as shown, the outer actuating portion 17 and the tip-portion 16 are cooperatively coupled together through the medium of a rocker element 18. Rocker element 18 is in the nature of a block having trunnion-acting opposite end portions 19 suitably journalled in aligned openings 20 in the laterally projected outer ends of spaced parallel anchoring flanges 21 rigidly carried by and projecting axially outwardly from the neck 8. As shown, the tip portion 16 projects transversely through the center of the rocker element 18 and has a relatively blunt extreme inner end 22 which comes into camming engagement with the outer surface 23 of the closure plate 14 when the outer end of the actuating portion 17 of lever means 15 is depressed, as shown in FIG. 2.

Tip portion 16 is provided at its outer end with an adjustment head 24 whereby the effective operative length of the tip portion 16 may be varied for initial adjustment with respect to the closure plate 14, and to compensate for wear thereafter.

On its extreme outer end the actuating portion 17 of lever means 15 is provided with an eye 25 which is adapted to receive a similar eye 26 on the lower end portion of a vertically disposed operating rod 27. The operating rod 27 on its upper end is shown with a readily graspable handle 28.

As shown in FIG. 2, when the operating rod 27 is lifted the tip portion 16 falls away from engagement with the surface 23 of the closure plate 14 so fast, due to the leverage of lever means 15, that fluid under pressure is discharged so rapidly through the mouth 10 as to permit the plunger 3 and automotive vehicle Y carried thereby to drop as though solely by action of gravity.

The letter Z identifies in its entirety any type of a graph forming device which may be utilized in connection with testing of the shock absorbers of the vehicle Y to reflect the condition thereof.

My invention has been thoroughly tested and found to be completely satisfactory for the accomplishment of the above objects, and while I have shown a preferred embodiment thereof, I wish it to be understood that the same may be capable of modification without departure from the scope and spirit of the appended claims.

What I claim is:

1. In a combined bumper jack and shock absorber testing device, a vertically disposed cylinder, a piston within said cylinder and having a lifting plunger working through the top of said cylinder, valve means for introducing fluid under pressure into only the lower end of said cylinder to raise said piston, means operable for gradually releasing the fluid under pressure within said cylinder, and independent means for selectively quickly releasing the fluid under pressure from said cylinder to permit said piston and load carried thereby to drop freely, said last-mentioned means comprising a tubular neck extending laterally outwardly from the lower end of said cylinder and which defines at its outer end a discharge mouth, a closure plate mounted for pivotal swinging movements toward and away from sealing engagement with said mouth and gravity biased toward said sealing engagement, and lever means for imparting closing movements to said closure plate, said lever means comprising a lever pivotally secured in closely spaced relation to its inner end on a horizontal axis disposed laterally outwardly from said closure plate, said lever at its inner end having a blunt tip which has camming engagement with said closure plate when the outer end of said lever is lowered and which drops away from engagement with said closure plate upon raising movements of the outer end of said lever.

2. The structure defined in claim 1 in which said lever tip is mounted for extending and retracting adjustments with respect to said closure plate.

3. In a device of the class described:
 (a) a cylinder,
 (b) a piston within said cylinder and having lifting means associated therewith,
 (c) valve means for introducing fluid under pressure into only one end of said cylinder to operate said lifting means,
 (d) and means associated with the said one end of said cylinder for quickly releasing the fluid under pressure therefrom to permit the piston and load carried thereby to drop freely,
 (e) said means comprising:
  (1) a tubular neck extending laterally outwardly from said one end of said cylinder and which defines at its outer end a discharge mouth,
  (2) a closure plate mounted for pivotal swinging movements toward and away from sealing engagement with said mouth and gravity biased toward said sealing engagement, and
  (3) a lever pivotally secured intermediate its ends on a horizontal axis disposed laterally outwardly from said closure plate, and having a tip which has camming engagement with said closure plate when the other end of said lever is lowered and which drops away from engagement with said closure plate upon raising movements of said other end of said lever.

References Cited by the Examiner
UNITED STATES PATENTS

| | | | |
|---|---|---|---|
| 1,278,917 | 9/18 | Hall | 91—450 |
| 1,812,533 | 6/31 | Hunt | 91—445 |
| 2,365,748 | 12/44 | Curtis | 60—52 |
| 2,805,839 | 9/57 | Branick | 254—93 |
| 2,923,147 | 2/60 | MacMillan | 73—11 |

SAMUEL LEVINE, *Primary Examiner.*